United States Patent Office 3,751,339
Patented Aug. 7, 1973

3,751,339
PROCESS FOR PREPARING CHLOR-
AMPHENICOL ANALOGUES
Takeo Suzuki and Haruo Honda, Tokyo, Japan, assignors to Kyowa Hakko Kogyo Kabushiki Kaisha, Tokyo-to, Japan
No Drawing. Filed Apr. 26, 1971, Ser. No. 137,695
Claims priority, application Japan, Apr. 28, 1970, 45/35,902
Int. Cl. C12d 13/00
U.S. Cl. 195—96　　　　　　　　　　　9 Claims

ABSTRACT OF THE DISCLOSURE

The present invention relates to a process for preparing analogues of chloramphenicol, characterized by culturing a microorganism capable of producing D-threo-2-propionamido-1-p-nitrophenyl-1,3-propanediol (hereinafter designated as Substance A) and/or D-threo-2-isobutyramido-1-p-nitrophenyl-1,3-propanediol (hereinafter designated as Substance B), under aerobic conditions in a culture medium containing assimilable carbon sources to form and accumulate said analogues of chloramphenicol therein and isolating and recovering the same therefrom.

The process of the present invention is directed to the preparation of chloramphenicol-related compounds by fermentation using inexpensive hydrocarbons or carbohydrates as raw materials. Such compounds have known utility as antibacterial medicine. Conventionally, analogues of chloramphenicol have been derived chemically from chloramphenicol obtained by the fermentation of a microorganism belonging to Actinomycetes or by chemical synthesis. A process for preparing analgoues of chloramphenicol directly by fermentation using bacteria has never been reported in the art.

It has now been discovered that the above mentioned two types of chloramphenicol analogues can be prepared with a good yield by means of culturing a microorganism normally selected from the group consisting of the genera Arthrobacter, Corynebacterium, and Nocardia capable of growing in a culture medium containing hydrocarbons, specifically n-paraffins as carbon source.

When compared with the preparation of chloramphenicol by fermentation using a microorganism belonging to Actinomycetes, the preparation of the analogues of chloramphenicol in accordance with the present invention has the following advantages:

(a) Shorter period of culturing time,
(b) Larger yields of the products, and
(c) Wider variety of suitable carbon sources (not only carbohydrates but also cheaper hydrocarbons such as n-paraffins, alcohols, organic acids, etc.).

Various microorganisms which are classified into Arthrobacter, Corynebacterium, Nocardia and other microorganisms closely related thereto may be used for the practice of the present invention. However, it is preferred to use, for example, the following microorganisms:

*Arthrobacter paraffineus* ATCC 15590
*Corynebacterium hydrocarboclastus* ATCC 15592
*Corynebacterium hydrocarboclastus* ATCC 21628
*Corynebacterium equi* ATCC 10146
*Corynebacterium pseudodiphtheriticum* ATCC 10701
*Nocardia gloverula* ATCC 13130
*Nocardia hydrocarbonoxydans* ATCC 15104

All of the above microorganisms as well as those indicated elsewhere in the specification are freely available to the public and are on deposit with the American Type Culture Collection.

It is preferred to use as carbon sources various hydrocarbon fractions containing n-paraffins, especially $C_{10}$ to $C_{22}$, preferably $C_{12}$ to $C_{18}$ n-paraffins. But it is also possible to use other carbon sources such as carbohydrates, organic acids, alcohols, etc. (e.g. glucose, sorbitol, sucrose, glycerol, acetic acid, etc.) as far as they are assimilable by the microorganisms employed.

Various inorganic and organic nitrogen sources can be used as nitrogen sources for the present invention.

In carrying out the cultivation, hydrocarbons or carbohydrates are used as main carbon sources. They are supplemented, for example, with organic nitrogen sources such as corn steep liquor, yeast extract etc., inorganic metallic salts such as iron, manganese, magnesium, potassium, sodium etc. and growth-promoting factors to provide a culture medium. The medium is sterilized and inoculated with the microorganism. The cultivation is carried out under aerobic conditions at 20–45° C. During the cultivation, the pH is adjusted to 4–10, preferably 6–8, for example, by addition of urea solution, aqueous ammonia, ammonia or ammonium carbonate solution. The cultivation is completed after 2–7 days. The completion of the fermentation can be confirmed by the values of the chloramphenicol analogues obtained as determined by means of the paper disc method so as to reach a maximum.

The following non-limitative examples illustrate the present invention.

EXAMPLE 1

*Corynebacterium hydrocarboclastus* ATCC 15592 was cultured with shaking for 24 hours in a medium having a composition of 1.0% of meat extract, 1.0% of peptone, 0.5% of NaCl and 2% of sorbitol and having a pH of 7.2 (before sterilization). The resultant seed culture was inoculated into 3.0 liters of a culture medium having the following composition contained in a 5-liter jar fermenter at a ratio of 10% by volume.

| | Percent |
|---|---|
| $KH_2PO_4$ | 0.2 |
| $MgSO_4 \cdot 7H_2O$ | 0.1 |
| $FeSO_4 \cdot 7H_2O$ | 0.02 |
| $(NH_4)_2SO_4$ | 0.5 |
| Corn steep liquor | 0.1 |
| $Na_2HPO_4$ | 0.2 |
| $MnSO_4 \cdot 4H_2O$ | 0.002 |
| $ZnSO_4 \cdot 7H_2O$ | 0.001 |
| $CuCl_2 \cdot 2H_2O$ | 0.0003 |
| Yeast extract | 0.5 |
| n-paraffin (v./v.) (mixture of $C_{12}$–$C_{15}$) | 10 |

The cultivation was carried out at 30° C. for 65 hours with agitation (650 r.p.m.) and aeration (1 liter/liter/min.) with sterilized air. The pH of medium was automatically adjusted to 6.5–6.8 with aqueous ammonia. Each 100 ml. of n-paraffin was supplemented to the medium three times after every 12 hours. The n-paraffin substrate was almost consumed after the completion of the fermentation.

The fermented liquor (2 liters) obtained by the removal of microbial cells from the broth was adjusted to a pH of 4.0. After addition of the same amount of ethyl acetate, the fermented liquor was shaken for 24 hours to extract analogues of chloramphenicol in the ethyl acetate layer. The thus-extracted liquor (2.3 liters) was dehydrated with anhydrous sodium sulphate and evaporated at 35° C. under reduced pressure. The resultant residue was further extracted with ethyl acetate (100 ml.). After centrifugation, the solvent layer was fed through a silica gel column (diameter: 4 cm.; height: 20 cm.) which was then washed thoroughly with chloroform. After this, a mixed solution of chloroform and methanol (95.5) was fed through the column.

In the course of the elution, Substance B was eluted into the fraction of from 200 ml. to 500 ml., and Substance A was eluted into the fraction of from 600 ml. to 1,000 ml., each of which was separately collected and concentrated. Each concentrated fraction was dissolved in ethanol, and Substances A and B were then separately crystallized by distilling off the solvent. In this manner Substances A (4 g.) and B (24 g.) were isolated.

The thus-isolated crystals were each purified by repeating the recrystallization from ethylene dichloride.

The isolated crystals of Substances A and B had lower antibiotic activities in vitro than that of the chloramphenicol, but had the same tendencies as to antibiotic spectrum. Both Substances A and B had a maximum ultra-violet absorption at 273 m$\mu$ which was the same as that of chloramphenicol.

From the results obtained by elemental analysis, infrared spectrum, nuclear magnetic resonance spectrum, mass spectrometry, etc., it was found that Substances A and B are respectively identical with the substances having the following structures, which have already been derived chemically from chloramphenicol.

(Substance A)

D-threo-2-propionamido-1-p-nitrophenyl-1,3-propanediol

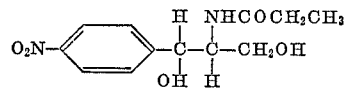

(Substance B)

D.threo-2-isobutyramido-1-p-nitrophenyl-1,3-propanediol

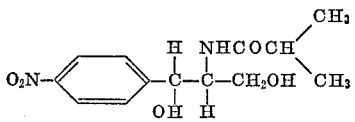

EXAMPLE 2

*Nocardia gloverula* ATCC 13130 was cultured in a similar culture medium to that described in Example 1 except glucose was substituted for n-paraffin. After 75 hours, 0.9 g./l. of Substance A and 0.3 g./l. of Substance B were produced.

EXAMPLE 3

*Arthrobacter paraffineus* ATCC 15590 was cultured in a similar manner to that described in Example 1 except supplementing n-paraffin, namely, fraction of $C_{12}$–$C_{15}$ (400 ml.). After culturing for 98 hours, there were obtained 1.2 g./l. of substance A and 1.7 g./l. of Substance B.

EXAMPLE 4

*Corynebacterium equi* ATCC 10146 was cultured for 24 hours in a culture medium containing 2% of glucose, 1% of polypeptone, 1% of meat extract and 0.3% of common salt. The resultant seed was inoculated into a medium having the following composition in a 5-liter jar fermenter at a ratio of 10% by volume, which was then cultured aerobically at 30° C. for 72 hours.

|  | Percent |
|---|---|
| Sucrose | 8 |
| $K_2HPO_4$ | 0.1 |
| $MnSO_4 \cdot 4H_2O$ | 0.01 |
| $(NH_4)_2HPO_4$ | 0.3 |
| $Na_2HPO_4$ | 0.1 |
| $MgSO_4 \cdot 7H_2O$ | 0.1 |
| $ZnSO_4 \cdot 4H_2O$ | 0.001 |
| Yeast extract | 1.0 |

The pH of the medium was controlled in a similar manner to that described in Example 1.

2.5 g./l. of Substance A and 0.8 g./l. of Substance B were isolated.

EXAMPLE 5

*Nocardia hydrocarbonoxydens* ATCC 15104 was cultured in a similar manner to that described in Example 1. 300 ml. of n-paraffin was added at an early stage. After 24 hours from the start of the cultivation, each 50 ml. of n-paraffin, namely, fraction of $C_{12}$–$C_{19}$, was additionally supplemented every 12 hours. By culturing for 69 hours, only Substance A (1.2 g./l.) was obtained.

EXAMPLE 6

*Corynebacterium pseudodiphtheriticum* ATCC 10701 was cultured for 72 hours in a similar medium to that described in Example 1 except supplementing with 1.0% of sucrose. Substance A was not produced, but 0.8 g./l. of Substance B was obtained.

EXAMPLE 7

*Corynebacterium hydrocarboclastus* KY 4339 (ATCC 21628) was cultured for 65 hours in a similar medium and in a similar manner to those described in Example 1. 1.2 g./l. of Substance A and 2.1 g./l. of Substance B were obtained therefrom.

Having described the present invention, that which is sought to be protected is set forth in the following claims.

What is claimed is:

1. A process for producing chloramphenicol analogues, comprising culturing a microorganism capable of producing D-threo - 2 - propionamido-1-p-nitrophenyl-1,3-propanediol, D-threo - 2 - isobutyramido-1-p-nitrophenyl-1,3-propanediol selected from the group consisting of Arthrobacter, Nocardia and Corynebacterium, in a medium containing assimilable carbon sources under aerobic conditions, so as to produce the above-mentioned chloramphenicol analogues in said medium and recovering the same therefrom.

2. The process of claim 1, wherein said culturing occurs at 20° C. to 45° C. at a pH of 4 to 10.

3. The process of claim 1, wherein said carbon source is a $C_{10}$ to $C_{20}$ n-paraffin.

4. The process of claim 1, wherein said carbon sources is a material containing sucrose or glucose as sugar source.

5. The process of claim 1, wherein the genus Arthrobacter is *Arthrobacter paraffineus* ATCC 15590.

6. The process of claim 1, wherein the genus Corynebacterium is *Corynebacterium hydrocarboclastus* ATCC 15592, *Corynebacterium hydrocarboclastus* ATCC 21628, *Corynebacterium equi* ATCC 10146 or *Corynebacterium pseudodiphtheriticum* ATCC 10701.

7. The process of claim 1, wherein the genus Nocardia is *Nocardia gloverula* ATCC 13130 or *Nocardia hydrocarbonoxydans* ATCC 15104.

8. The process of claim 1, whereby D-threo-2-isobutyramido-1-p-nitrophenyl-1,3-propanediol is produced.

9. The process of claim 1, whereby D-threo-2-propionamido-1-p-nitrophenyl-1,3-propanediol is produced.

References Cited

UNITED STATES PATENTS 2,483,892  10/1949  Ehrlich et al. _____ 195—80 R

A. LOUIS MONACELL, Primary Examiner

R. J. WARDEN, Assistant Examiner

U.S. Cl. X.R.

195—80